US011159829B2

(12) United States Patent
Mikoshiba et al.

(10) Patent No.: US 11,159,829 B2
(45) Date of Patent: Oct. 26, 2021

(54) SERVER DEVICE FOR RECOMMENDING VIDEOS RELATING TO A GAME, AND STORAGE MEDIUM USED IN SAME

(71) Applicant: KONAMI DIGITAL ENTERTAINMENT CO., LTD., Tokyo (JP)

(72) Inventors: Eiri Mikoshiba, Tokyo (JP); Kenichi Kataoka, Tokyo (JP); Mitsuru Tamagawa, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 16/570,323

(22) Filed: Sep. 13, 2019

(65) Prior Publication Data
US 2020/0007899 A1    Jan. 2, 2020

Related U.S. Application Data

(63) Continuation of application No. PCT/JP2018/008571, filed on Mar. 6, 2018.

(30) Foreign Application Priority Data

Mar. 15, 2017    (JP) .............................. JP2017-050046

(51) Int. Cl.
*H04N 21/218*    (2011.01)
*A63F 13/85*    (2014.01)
(Continued)

(52) U.S. Cl.
CPC ......... *H04N 21/2181* (2013.01); *A63F 13/85* (2014.09); *A63F 13/86* (2014.09);
(Continued)

(58) Field of Classification Search
CPC ............. H04N 21/4781; H04N 21/274; H04N 21/2181; H04N 21/25891; A63F 13/85; A63F 13/86
See application file for complete search history.

(56) References Cited

U.S. PATENT DOCUMENTS 8,696,464 B2 *    4/2014    Smith ..................... A63F 13/63
463/42
9,454,993 B1 *    9/2016    Lawson ........... H04N 21/47205
(Continued)

FOREIGN PATENT DOCUMENTS

JP    2002-224452 A    8/2002
JP    2003091458 A    3/2003
(Continued)

OTHER PUBLICATIONS

Notice of Reasons for Refusal dated Feb. 21, 2020 from the Japanese Patent Office in application No. 2018-13082.
(Continued)

*Primary Examiner* — Jeong S Park
(74) *Attorney, Agent, or Firm* — Sughrue Mion, PLLC

(57) ABSTRACT

Provided is a server device that is capable of extracting and recommending various videos relating to each user from a plurality of videos relating to a game. A center server manages video data for a video group relating to a game such that individual videos are associated with information about a "managed items", extracts some video from the video group on the basis of that information, and distributes the video data of the some video to a user terminal connected via a network. When a user ID is provided from the user terminal, the center server extracts some related video relating to activity records which is described in play data so as to be associated with user IDs as the some video on the basis of the information about the "management item" and
(Continued)

the activity records by using the user ID as a reference, and provides this information.

3 Claims, 8 Drawing Sheets

(51) Int. Cl.
*H04N 21/258* (2011.01)
*A63F 13/86* (2014.01)
*H04N 21/478* (2011.01)

(52) U.S. Cl.
CPC . *H04N 21/25816* (2013.01); *H04N 21/25875* (2013.01); *H04N 21/25891* (2013.01); *H04N 21/4781* (2013.01); *A63F 2300/206* (2013.01)

(56) References Cited

U.S. PATENT DOCUMENTS

| | | | |
|---|---|---|---|
| 9,630,097 B2* | 4/2017 | Paradise | A63F 13/355 |
| 2009/0137322 A1* | 5/2009 | Lyle | A63F 13/327 463/43 |
| 2011/0312424 A1* | 12/2011 | Burckart | H04N 21/4788 463/42 |
| 2013/0005471 A1* | 1/2013 | Chung | A63F 13/86 463/42 |
| 2014/0187315 A1* | 7/2014 | Perry | A63F 13/12 463/29 |
| 2016/0136523 A1* | 5/2016 | Yano | A63F 13/355 463/31 |

FOREIGN PATENT DOCUMENTS

| | | |
|---|---|---|
| JP | 2008262580 A | 10/2008 |
| JP | 2010-35968 A | 2/2010 |
| JP | 2010-46159 A | 3/2010 |
| JP | 2013-250839 A | 12/2013 |
| JP | 2014023881 A | 2/2014 |
| JP | 2015-16104 A | 1/2015 |
| JP | 2015-165910 A | 9/2015 |
| JP | 2015-198404 A | 11/2015 |
| JP | 2016-118854 A | 6/2016 |
| JP | 2016-162069 A | 9/2016 |
| JP | 2016-189804 A | 11/2016 |
| JP | 2017-23348 A | 2/2017 |
| WO | 2015133032 A1 | 9/2015 |

OTHER PUBLICATIONS

International Search Report in International Application No. PCT/JP2018/008571, dated Jun. 12, 2018.
Written Opinion in International Application No. PCT/JP2018/008571, dated Jun. 12, 2018.
Communication dated Sep. 28, 2017, from the Japanese Patent Office in counterpart application No. 2017-050046.
Communication dated Feb. 15, 2018, from the Japanese Patent Office in counterpart application No. 2017-050046.
Communication dated Jun. 21, 2018, from the Japanese Patent Office in counterpart application No. 2017-050046.
Communication dated Aug. 26, 2019, from the Japanese Patent Office in counterpart application No. 2017-50046.
Communication dated Jul. 21, 2017, from the Japanese Patent Office in counterpart application No. 2017-050049.
Communication dated Nov. 28, 2017, from the Japanese Patent Office in counterpart application No. 2017-050049.
Communication dated Feb. 19, 2019, from the Japanese Patent Office in counterpart application No. 2017-50049.
Communication dated Jul. 16, 2019, from the Japanese Patent Office in counterpart application No. 2017-50049.
[PS4 sale special edition] What is changed by PS 4, Check the renovated next generation user interface, Inside [online] Feb. 19, 2014, <URL:https://www.inside-games.jp/article/2014/02/19/74480.html> (3 pages total).
Communication dated Feb. 16, 2021, issued by the Korean Intellectual Property Office in application No. 10-2019-7027274.

* cited by examiner

SERVER DEVICE FOR RECOMMENDING VIDEOS RELATING TO A GAME, AND STORAGE MEDIUM USED IN SAME

TECHNICAL FIELD

The present invention relates to a server device or the like including a video data storage device which stores video data for displaying a plurality of videos relating to a game provided by a game terminal, and that, when managing the videos and contents information related to contents of the videos in mutual association, extracts a part of the videos from the plurality of videos on the basis of a request from a video display terminal that is connected via a network and on the basis of the contents information for the videos, and distributes the video data corresponding to the part of videos to the video display terminal.

BACKGROUND ART

There is a per se known server device including a video data storage device which stores video data for displaying a plurality of videos relating to a game provided by a game terminal, and that, when managing the videos and contents information related to contents of the videos in mutual association, extracts a part of the videos from the plurality of videos on the basis of a request from a video display terminal that is connected via a network and on the basis of the contents information for the videos, and distributes the video data corresponding to the part of videos to the video display terminal. For example, an information processing system is per se known that employs metadata including event codes corresponding to events that serve as this type of contents information, and that, searches for and distributes video corresponding to events that is in progress during a play of a game (for example, refer to PTL1).

CITATION LIST

Patent Literature

PTL1: JP2015-198404A.

SUMMARY OF INVENTION

Technical Problem

With the system of PTL1, videos related to events of the game currently being played are found from among the plurality of videos to be distributed. However, the search conditions such as events and so on are undesirably limited to the state of play of the game currently being played. Due to this, various searches cannot be performed; for example, it is not possible to extract videos of games including events that are similar to events in the game that is being played, or in which characters appear that are similar to those of the game that is being played. As a result, it is not possible to recommend various videos to each user, and there is a possibility that it may not be possible to provide sufficient guidance for the game. At least, it is not supposed to guide the user to other games via videos, from the game which is in a play.

Furthermore, with the system of PTL1, since searching for videos and replaying thereof are executed while the game is being played, accordingly, for example, there is a requirement for a single terminal that functions both as a video display terminal and also as a game terminal, such as a single terminal that executes a single application that implements both provision of the game and also video replay. On the other hand, there is also a need for video replay and playing of the game on the basis of separate terminals (including a single terminal that employs separate applications). However, with the system of PTL1, it is not possible to satisfy requirements of this type.

Accordingly, it is an object of the present invention to provide a server device and so on that is capable of extracting various videos relating to users from a plurality of game related videos, and that is capable of recommending those videos.

Solution to Technical Problem

The server device of the present invention is a server device that comprises a computer having a video data storage device which stores video data for displaying a plurality of videos relating to a game provided by a game terminal, and that, when managing the videos and contents information related to contents of the videos in mutual association, extracts a part of the videos from the plurality of videos on the basis of a request from a video display terminal that is connected via a network and the contents information, and distributes the video data corresponding to the part of the videos to the video display terminal, and wherein the computer serves as: an activity data storage device that stores activity data in which user identification information for identifying users and activity result information for the users in relation to the game are described in mutual association; a video extraction device that, when the user identification information of a user is provided via the video display terminal along with the request from the video display terminal, extracts, on the basis of the activity data and the contents information, a related video relating to the activity result information of the user as the part of the videos by taking the user identification information as reference from the plurality of videos; and an information provision device that provides information about the related video to the video display terminal on the basis of a result of extraction by the video extraction device.

On the other hand, the non-transitory computer readable storage medium of the present invention is a non-transitory computer readable storage medium storing a computer program that is adapted to cause the computer having the video data storage device and the activity data storage device to function as the devices of the server device described above.

DESCRIPTION OF EMBODIMENTS

Figure 1:
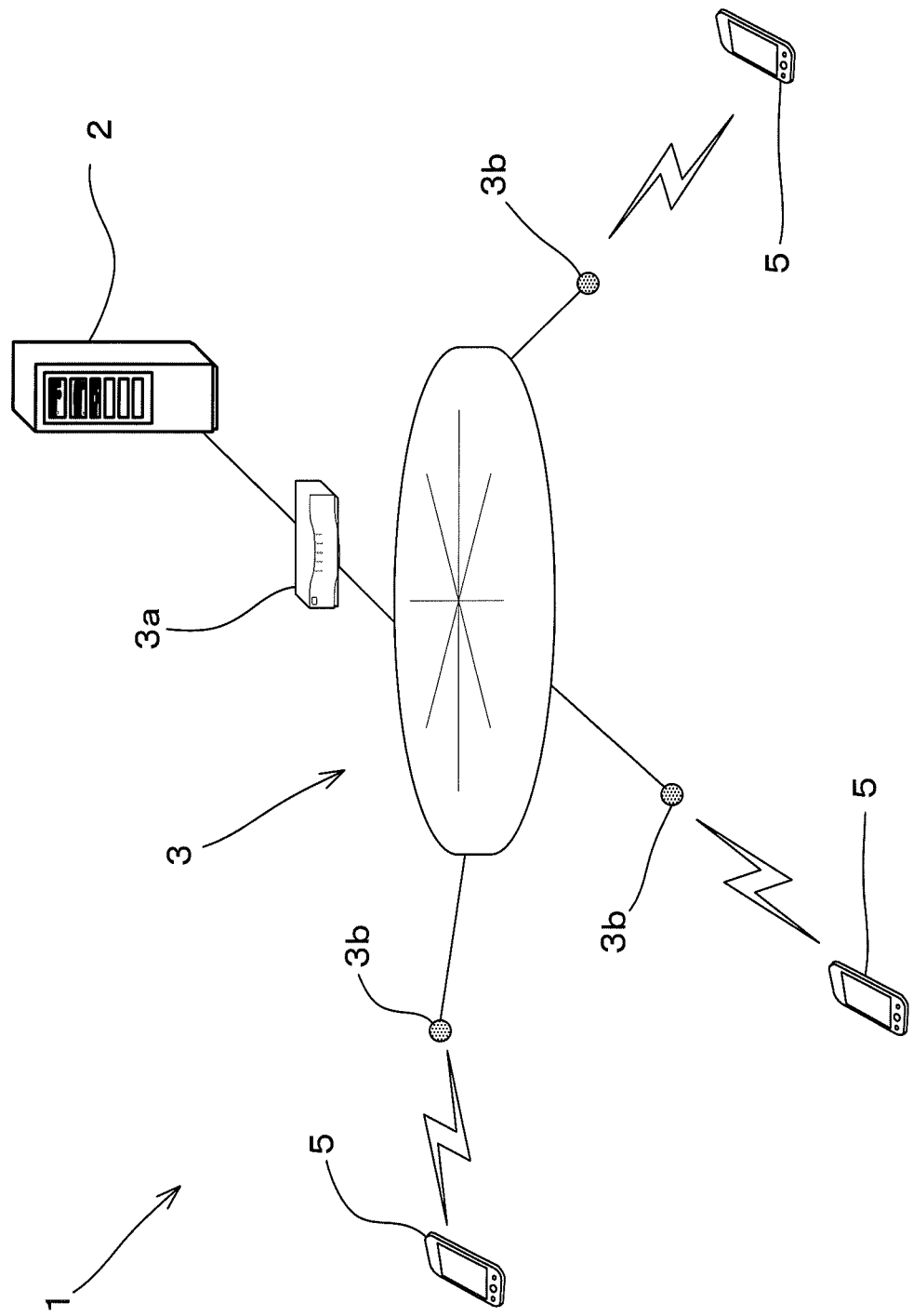
FIG. 1 is a figure showing a summary of the overall structure of a video distribution system according to an embodiment of the present invention.

A video distribution system according to an embodiment of the present invention will now be explained in the following. FIG. 1 is a figure showing a summary of the overall structure of the video distribution system according to an embodiment of the present invention. As shown in FIG. 1, the video distribution system 1 includes a central server 2, which functions as a server device. The central server 2 is not restricted to being an example that is built from a single physical device. For example, a single logical central server 2 may be built from a server group that consists of a plurality of physical devices. Moreover, a logical central server 2 may be built by employing cloud computing.

User terminals 5 are connected to the central server 2 via a network 3. The user terminals 5 are types of network terminal device employed by users. For example, portable telephones (including smart phones) may be employed as the user terminals 5. Portable telephones are one type of user terminal via which applications are provided to individual users. For example, a portable telephone may have a video replay function of displaying (i.e. reproducing) videos. And, for example, a portable telephone may function as a video display terminal for displaying videos via this type of video replay function. Moreover, a portable telephone may provide functions of various other types by executing software. For example, a game machine function of enabling the user to play a game may be included in functions of this type. And, for example, a portable telephone may function as a game terminal that provides a game via this type of game machine function. In other words, the user terminals 5 may function both as video display terminals and as game terminals. Incidentally, apart from the above, as user terminals 5, network terminal devices of various types that can be connected to the network and that provide individual applications to users may be employed, such as, for example, personal computers or portable type tablet terminal devices.

As one example, the network 3 may be built by implementing network communication that employs the TCP/IP protocol. Typically, the network 3 is built as a combination of the internet that serves as a WAN and an intranet that serves as a LAN. In the example of FIG. 1, the central server 2 is connected to the network 3 via a router 3a, and each of the user terminals 5 is connected to the network 3 via an access point 3b.

Incidentally, the network 3 is not restricted to being of a type that employs the TCP/IP protocol. Various formats that use cable circuits or wireless circuits or the like for communication (including infrared communication and Near Field communication and so on) may be employed for the network 3.

Via the network 3, the central server 2 provides web services of various kinds to the users of the user terminals 5. Such web services include a video distribution service for distributing videos to the user terminals 5. The details of the video distribution service will be described hereinafter.

Incidentally, the web services may include other services of various types corresponding to various functions of the user terminals 5. For example, the web services may include an information service for providing information of various kinds related to videos or to games. Moreover, for example, the web services may also include distribution services for distributing data or software of various kinds to the individual user terminals 5 (including data updates and so on). Furthermore, the web services may also include a community service of providing an information exchange forum for transmission, exchange, and sharing of information by users, a service of providing IDs for identifying individual users, a matching service of matching users together when a plurality of users play a game in common via the network 3, and so on.

Figure 2:
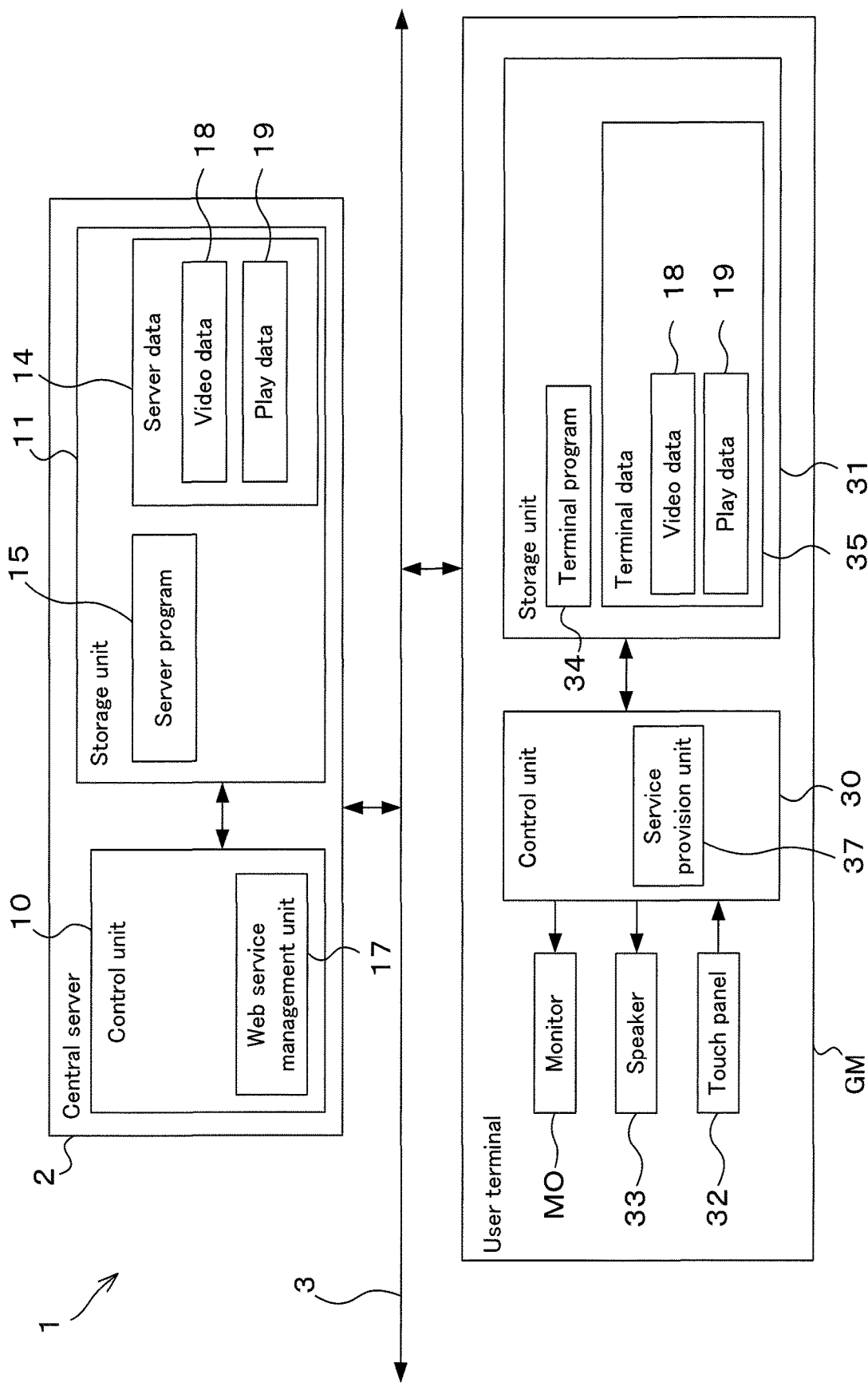
FIG. 2 is a figure showing the structure of principal portions of a control system of the video distribution system.

Next, principal portions of a control system of the video distribution system 1 for providing a game will be explained. FIG. 2 is a figure showing the structure of principal portions of the control system of the video distribution system 1. As shown in FIG. 2, the central server 2 includes a control unit 10 which serves as a computer, and a storage unit 11. The control unit 10 is built as a computer unit in which a microprocessor and various peripheral devices such as internal storage devices required for the operation of the microprocessor (such as, for example, ROM and RAM) and so on are combined. Incidentally, input devices such as a keyboard and so on, and output devices such as a monitor and so on, may be connected to the control unit 10. However, these are not shown in the figures.

The storage unit 11 is connected to the control unit 10. The storage unit 11 may be adapted to be capable of maintaining storage even when power is not supplied; for example, it may be built around a high capacity storage medium such as a magnetic tape or the like. Server data 14 and a server program 15 are stored in the storage unit 11. The server program 15 is a computer program that is required for the central server 2 to provide services of various types to the user terminals 5. By the control unit 10 reading in and executing the server program 15, a web service management unit 17 is provided interior to the control unit 10.

The web service management unit 17 executes processing required for providing the web services mentioned above. The web service management unit 17 is a logical device that is implemented by a combination of computer hardware and a computer program. Incidentally, apart from the above, other logical devices of various types may also be provided internally to the control unit 10. However, these are not shown in the figures.

The server data 14 is data that is referred to as the server program 15 is being executed. For example, the server data 14 may include video data 18 and play data 19 which serves as activity data. Video data 18 is data for displaying video of various types. For example, this type of video may include a plurality of videos relating to a game. In more concrete terms, the video data 18 may, for example, include data for displaying, as a video, game screen transitions during playing of a game from the past. Moreover, the play data 19 is data for managing unique information that is unique to individual users. For example, this type of unique information may include information about activity records related to games of individual users. And, for example, the play data 19 may be used for carrying play results from previous sessions (i.e. situations from past play), or for carrying setting details that are unique to each user. The details of the video data 18 and of the play data 19 will be described in detail hereinafter.

Incidentally, apart from the above, the server data 14 may, for example, include data of various types for web services, such as ID management data for managing IDs of various types such as user IDs and so on. However, this is not shown in the figure.

On the other hand, each of the user terminals 5 is provided with a control unit 30, a storage unit 31, a monitor MO, a touch panel 32, and a speaker 33. The storage unit 31, the monitor MO, the touch panel 32, and the speaker 33 are all connected to the control unit 30. The control unit 30 is built as a computer unit in which a microprocessor and various peripheral devices such as internal storage devices required for the operation of the microprocessor (like, for example, ROM and RAM) and so on are combined. Incidentally, for example, apart from the above, devices of various types that are required for replaying videos or providing games or the like may be connected to the control unit 30. However, these are not shown in the figures.

The monitor MO is a per se known display device for displaying images and so on of various types on the basis of output signals from the control unit 30. As one example, according to output signals from the control unit 30, the monitor MO may display videos and game screens for playing games. The touch panel 32 is a per se known input device that, when touched by the user with a finger or the like, outputs a signal corresponding to the position of contact. For example, the touch panel 32 may be built to be transparent, and may be disposed by being overlaid upon the front surface of the monitor MO. And, for example, on the basis of touch operation by the user, the touch panel 32 may output a signal to the control unit 30 corresponding to the touched position. In a similar manner, the speaker 33 is a per se known output device (an audio reproduction device) for replaying audio of various types on the basis of output signals from the control unit 30. According to output signals from the control unit 30, the speaker 33 may, for example, replay audio of various types such as BGM (background music) and so on employed in videos or games.

On the other hand, the storage unit 31 may be built so as to be capable of maintaining storage even if power is not supplied, for example around a magnetic recording medium or an optical recording medium or a flash SSD (Solid State Drive) or the like. A terminal program 34 and terminal data 35 are stored in the storage unit 31. The terminal program 34 is a computer program required for the user terminal 5 to provide services of various types. For example, replaying of videos and provision of games may be included in this type of service. Along with execution of the terminal program 34, a service provision unit 37 is provided internally to the control unit 30. The service provision unit 37 executes processing of various types required for providing services, such as replaying of videos and playing of games and so on. The service provision unit 37 is a logical device that is implemented by a combination of computer hardware and a computer program. Incidentally, apart from the above, other logical devices of various types may also be provided internally to the control unit 30. However, these are not shown in the figures.

The terminal data 35 is data that is referred to while the terminal program 34 is being executed. For example, the terminal data 35 may include video data 18 and play data 19. For example, at least a part of this data may be supplied from the central server 2, so that a required portion is included. Incidentally, apart from the above, the terminal data 35 may, for example, include data of various types for performing other services of various types. For example, audio data such as BGM and so on for replaying audio of various types required for videos or games, image data for displaying images of various types required for games, and the ID management data described above, may be included in data of this type. However, these are not shown in the figures.

Next, the details of the video distribution service provided by the video distribution system 1 will be explained. As mentioned above, the video distribution service is a service for distributing videos to the user terminals 5. For example, a video that is to be distributed may be uploaded from a user terminal 5 to the central server 2 via the network 3. In other words, video data 18 for replaying a video that is to be distributed may be provided from a user terminal 5. And the video distribution service may include uploading of this type of video data 18. Furthermore, the video distribution service is adapted, if the video data 18 corresponds to a plurality of videos, to extract a part of the videos on the basis of an extraction condition for narrowing down the videos to be distributed to a part thereof. For example, unique information (including activity result information) that is unique to a user who uses a user terminal 5 may be employed as the extraction condition. In other words, a part of the videos may be extracted by the video distribution service on the basis of this type of unique information. And in the video distribution service, for example, video data 18 corresponding to this part of the videos may be distributed to the user terminal 5 as the subject for distribution. In this case, the video distribution service may be adapted to provide information related to this part of the videos to the user terminal 5. On the other hand, for example, in the opposite way to the above, the video distribution service may be adapted to eliminate video data 18 corresponding to such a part of the videos from the subjects for distribution. In other words, the video distribution service may be adapted to restrict the viewing of some of the videos (i.e. to distribute videos while excluding some of the videos).

Figure 3:
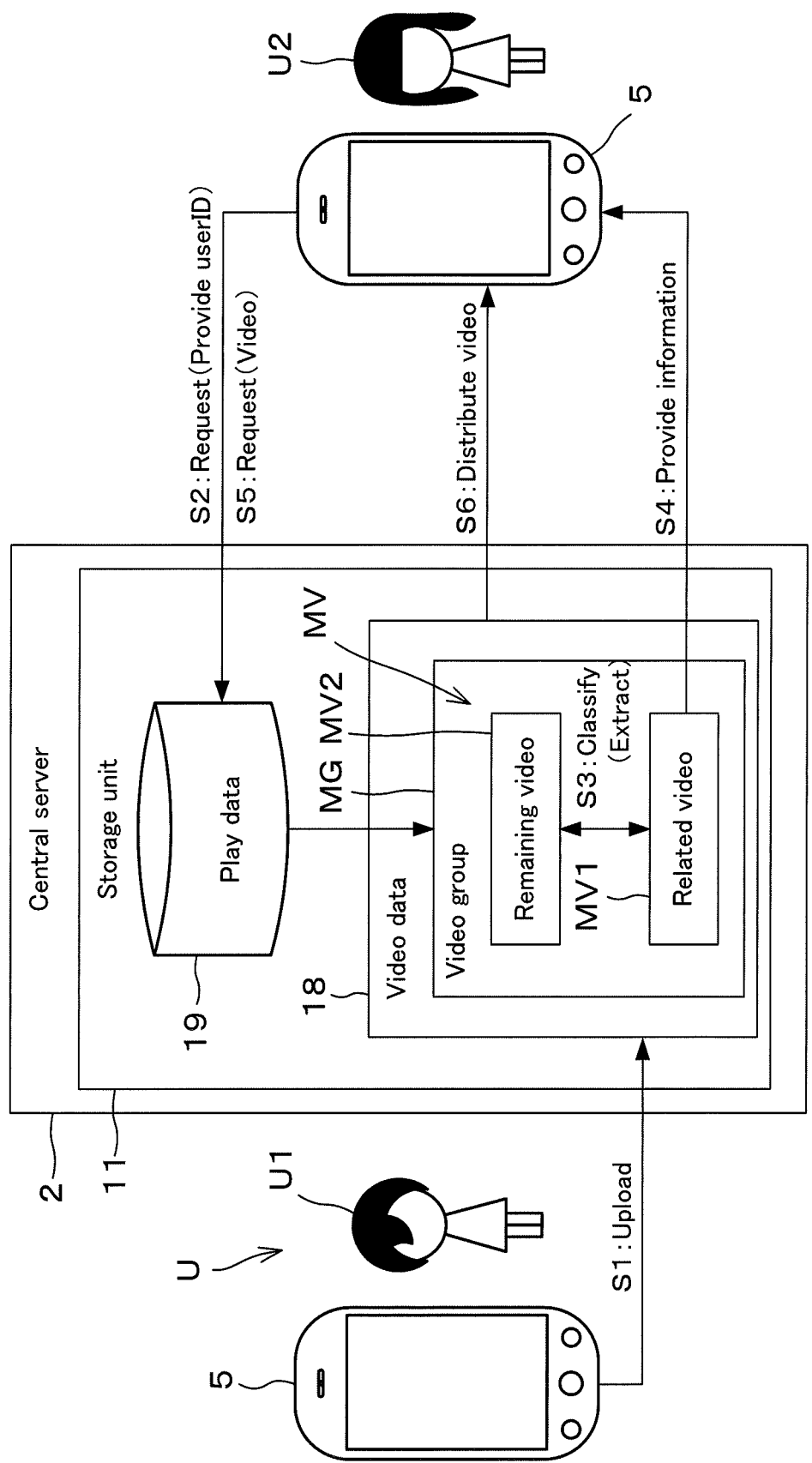
FIG. 3 is an explanatory figure for explanation of an example of a video distribution service when a part of videos extracted on the basis of an extraction condition are distributed.

A summary of an example of the video distribution service will now be explained in concrete terms with reference to FIGS. 3 and 4. FIG. 3 is an explanatory figure for explanation of an example of the video distribution service when a part of the videos that have been extracted on the basis of the extraction condition are distributed. Furthermore, the example of FIG. 3 shows a case in which, among the unique information in the play data 19, activity result information related to the game is used as the extraction condition. In this case, for example, as shown in FIG. 3, on the basis of the activity record of the game, the video distribution service may classify a group MG of videos that have been uploaded from a user terminal 5 into videos MV relating to this activity record (sometimes in the following these are termed the "related videos MV1") and other videos MV (sometimes in the following these are termed the "remaining videos MV2"), and may provide information specifying the related videos MV1 to the user terminal 5. In other words, the video distribution service may extract the related videos MV1 on the basis of the activity record in the game of the user U who is requesting distribution via the user terminal 5, and may provide information specifying the related videos MV1 to the user terminal 5. And the video distribution service may be adapted to distribute video data 18 corresponding to a video MV that has been selected on the basis of this type of information to the user terminal 5.

In concrete terms, for example, with the video distribution service, first, video data 18 for displaying a video may be uploaded from a user terminal 5 (S1). If, for example, the user terminal 5 is being used by a first user U1, then the subject of this uploading may be restricted to being a video MV related to the first user U1, or alternatively may not be restricted to being a video of this type. For example, a game video of a game played by the first user U1 may also be employed as a video MV related to the first user U1. In other words, if for example the user terminal 5 is functioning as a game terminal by executing an application (software) for a game for expressing a game machine function, then video data 18 for displaying a game video corresponding to the game played with the application (in the following, this is sometimes termed a "game application") may be uploaded. Moreover, for example, the user terminal 5 may execute provision, recording, and uploading of this type of game via the game application. In other words, the game application may be adapted to be capable of providing the game, of creating a video of the play of the game, and of executing uploading of video data 18 corresponding to the video.

Incidentally, uploading of a video may, for example, be performed via a video application for implementing the video replay function. For example, a web browser application (hereinafter sometimes termed a "web browser") may be employed as this type of video application. In other words, video uploading may be performed via a web application that is separate from the game application for the game.

On the other hand, a user terminal 5 may request the central server 2 to distribute videos according to commands from individual users U (S2). For example, in order to identify the individual users U, this request may include an information item specifying a unique user ID for each user. In concrete terms, for example, if the user terminal 5 is employed by a second user U2 who is different from the first user U1, then, upon the distribution request to the central server 2, the user terminal 5 may provide to the central server 2 information specifying the user ID that corresponds to the second user U2. Moreover if, for example, the user terminal 5 functions as a video display terminal along with executing a video application, then this type of request may be made via an application of this type. For example, a web browser may be employed as a video application of this type. In other words, a request of this type for video distribution may be made via a web application that is separate from the game application. Or the request could also be made via the game application.

Furthermore, when a video distribution request arrives from a user terminal 5, for example, the central server 2 may classify (extract) a video group MG (i.e. a plurality of videos MV) corresponding to the video data 18, on the basis of the play data 19 of the user U who made the request (S3). For example, if the user terminal 5 is being used by a second user U2, then, first, the central server 2 may specify the play data of the second user U2 on the basis of the user ID included in the request. And, for example, the central server 2 may classify the video group MG corresponding to the video data 18 into related videos MV1 and remaining videos MV2, on the basis of the activity result information of the second user U2 included in the play data 19. In more concrete terms, for example, on the basis of the play data 19, and while employing the user ID as a key (i.e. as a reference), the central server 2 may classify, as related videos MV1, game videos of games for which the second user U2 has a playing record, game videos of games relating to such games (for example, games in which the characters are common, or the like), videos MV that have been uploaded by other users U with whom an association is set in the game application (for example, if the first user U1 is set as a friend by the second user U2, then the first user U1 may function as another user U of this type), and so on.

Next, the central server 2 provides information related to the related videos MV1 to the user terminal 5 that was the source of the request (S4). For example, as this type of information, the central server 2 may provide recommendation information recommending related videos MV1 to the user terminal 5. Moreover, if a plurality of the related videos MV1 exist, then, as this type of information related to the related videos MV1, the central server 2 may also provide thumbnails (i.e. a list of reduced images) of these related videos. In this case, for example, these thumbnails of the related videos MV1 may be arranged on the basis of some sorting criterion. For example, the degree of progress in the game, the game rank, the user level, the character or the like may be employed as such a sorting criterion. In other words, for example, the central server 2 may provide thumbnails of the related videos MV1 arranged on the basis of the degree of progress in the game or the like to the user terminal 5 as recommendation information. It should be understood that, for example, the central server 2 may provide, not only information relating to the related videos MV1, but also information relating to the remaining videos MV2, in other words may provide thumbnails of the remaining videos MV2, provided that the related videos MV1 are preferentially displayed.

Next the user terminal 5 may, for example, make a second request to the central server 2 so as to specifically to designate the video MV to be the subject of distribution (S5). In concrete terms, for example, on the basis of the result of selection among the thumbnails of the related videos MV1 and so on, the user terminal 5 may request the central server 2 to distribute video data 18 of the video MV that has now been selected. And the central server 2 may distribute the subject video data 18 to the user terminal 5 on the basis of this type of request (S6). In other words, the central server 2 may specify video data 18 for the specific video MV that has been requested from the video group MG, and may distribute this video data 18 to the user terminal 5.

Figure 4:
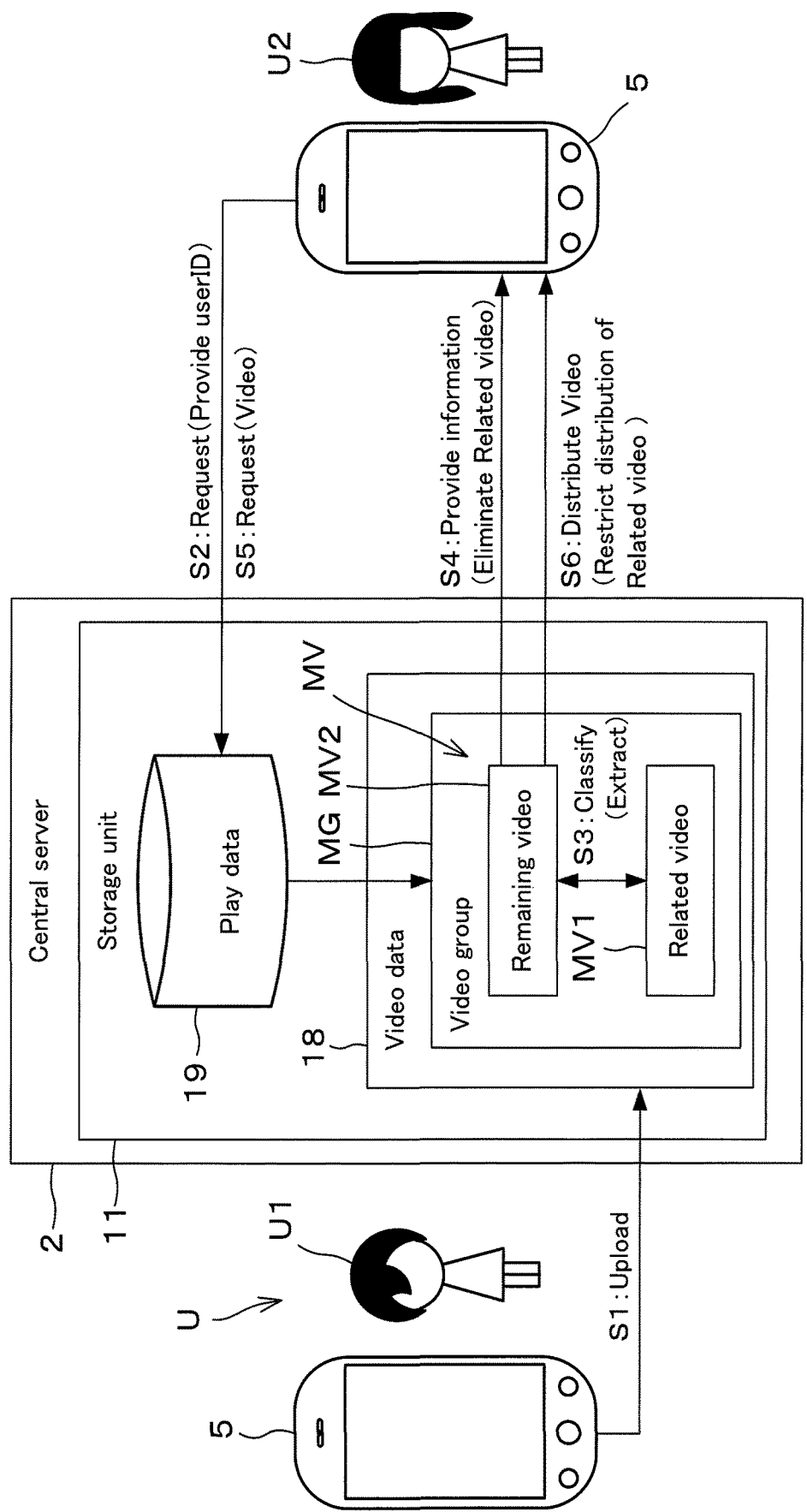
FIG. 4 is an explanatory figure for explanation of an example of a video distribution service when videos other than the part of videos extracted on the basis of an extraction condition are distributed.

On the other hand, FIG. 4 is an explanatory figure for explanation of an example of the video distribution service when videos other than the part of the videos extracted on the basis of the extraction condition are distributed. Furthermore, the example of FIG. 4 shows a case in which unique information that is unique to each user included in the play data 19 is employed as the extraction condition. In this case, for example, as shown in FIG. 4, the video distribution service may be adapted to extract, as the related videos MV1, videos MV whose viewing is to be restricted on the basis of the unique information in the play data 19, and to provide to the user terminal 5 video data 18 corresponding to the remaining videos MV2 other than these. Moreover, if the remaining videos MV2 include a plurality of videos MV, then the video distribution service may provide information related to those remaining videos MV2 to the user terminal 5. In other words, the video distribution service may only provide information related to the remaining videos MV2 to the user terminal 5, with the related videos MV1 having been eliminated. And, as subject for distribution, the video distribution service may distribute to the user terminal 5 the video data 18 of the videos MV that have been selected on the basis of this type of information for the remaining videos MV2.

In concrete terms, uploading of a video (S1) and requesting of a video (S2) may, for example, be performed in a manner similar to the case of FIG. 3. Furthermore, when a request (S2) for a video is made, the central server 2 may classify the video group MG on the basis of the play data 19, in a manner similar to the case with the example of FIG. 3. In this case, the central server 2 may specify unique information for each user included in the play data 19 by employing the user ID as a key, and may perform classification on the basis of this unique information. For example, the degree of progress in the game (which may include whether or not various events have been implemented), the age of the user, and the like may be employed as this type of unique information. In other words, the central server may classify the videos MV on the basis of the degree of progress in the game or the age of the user or the like. In more concrete terms, for example, in response to a request from the second user U2, the central server may take the degree of progression of the second user U2 in the game as a reference, and may classify game videos whose degree of progression is outside a predetermined range before and after that reference as being related game videos MV1. In other words, for example, the central server 2 may classify as being related videos MV1, videos MV whose degree of progression is greater than a predetermined range of degree of progression on the basis of the degree of progression of the second user U2. Alternatively, if for example an appropriate viewing age is set for each video MV, then, on the basis of the age of the second user U2, the central server 2 may classify videos MV that correspond to an inappropriate viewing age as being related videos MV1.

Incidentally, for example, the central server 2 may perform the classification of the videos MV (S3) by units of the videos MV, or, if for example information specifying the degree of progression and so on is managed by frame units of game screens or the like, may perform the classification by frame units of this type. Moreover, if parts of the frame units or the like, or of the videos MV, correspond to an extraction condition, then, for example, the central server 2 may perform predetermined processing such as mosaic processing or the like upon these parts of the videos in order to restrict viewing, and the videos before this type of processing may be classified as being the related videos MV1, while the videos MV after the processing may be classified as being the remaining videos MV2, respectively. In other words, as one example, by performing special processing upon these parts of the videos, the central server 2 may change the videos MV (i.e. the related videos MV1) that include portions corresponding to the extraction condition into the videos MV (i.e. the remaining videos MV2) that can be viewed.

Following the classification of the videos MV (S3), for example, the central server 2 may provide information related to the remaining videos MV2 to the user terminal 5 that was the source of the request. For example, if the remaining videos MV2 include a plurality of videos MV, then the central server 2 may provide thumbnails as this type of information. In other words, the central server 2 may provide thumbnails to the user terminal 5 while excluding the related videos MV1, so that a request (S5) to be described hereinafter is not performed in relation to the related videos MV1. Furthermore, for example, in a similar manner to the case with the example of FIG. 3, the central server 2 may again classify the remaining videos MV2 on the basis of the activity records in the play data 19 or the like, and may provide recommendation information based upon the result of this classification to the user terminal 5. And the order of arrangement of the thumbnails may be set on the basis of a sorting criterion.

Next, for example, the user terminal 5 may issue the request to the central server 2 for a second time, so as to provide the result of selection from the information relating to the remaining videos MV2 (S5). In concrete terms, for example, on the basis of the selection result among the thumbnails of the remaining videos MV2, the user terminal 5 may request the central server 2 to distribute video data for the video MV that has been selected there. And, in a similar manner to the case with the example of FIG. 3, the central server 2 may distribute the subject video data 18 to the user terminal 5 on the basis of this type of request (S6). In this manner, for example, the central server 2 may restrict the distribution of the related videos MV1 by restricting the provision of information related to the related videos MV1. As one example, a video distribution service may be implemented by this type of flow.

Figure 5:
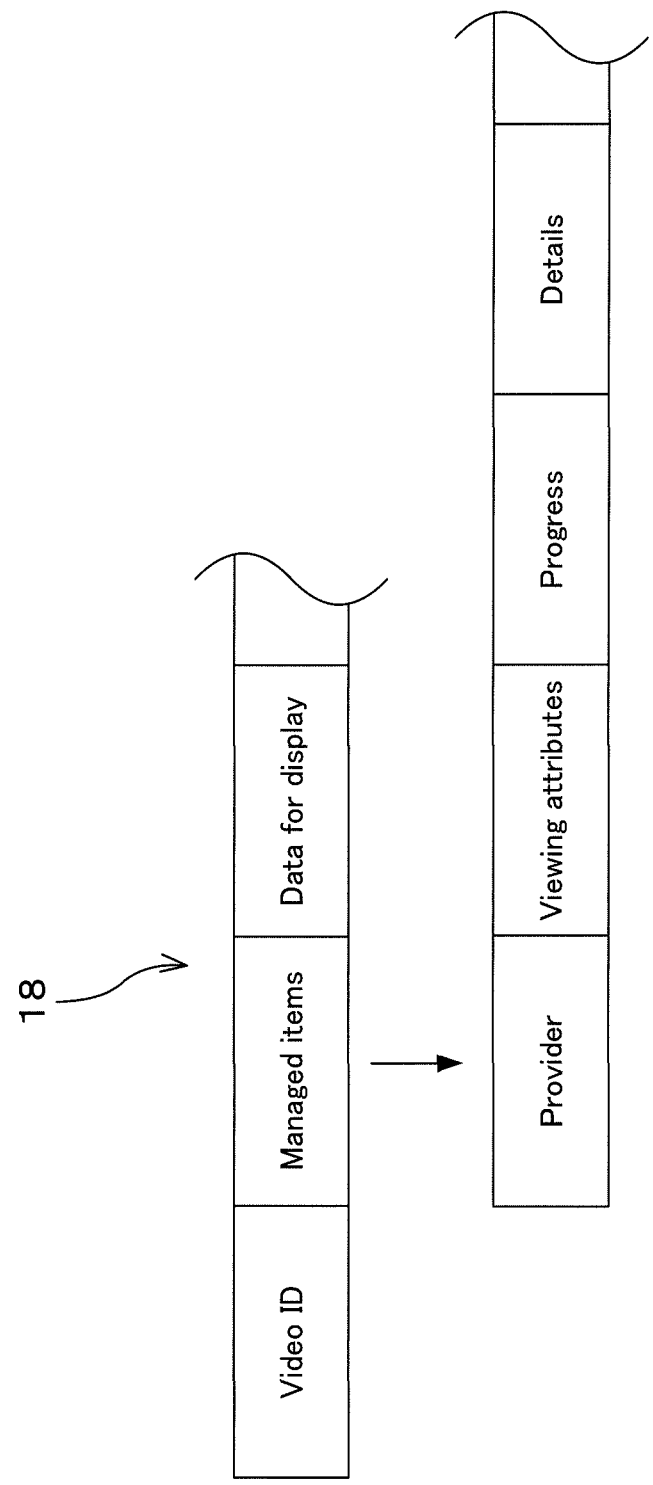
FIG. 5 is an explanatory figure for explanation of an example of the contents of video data.

Next, the details of the video data 18 and the play data 19 will be explained. As described above, the video data 18 is data for displaying the video MV. Furthermore, if for example unique information that is unique to each user (including activity result information) is employed as the extraction condition, then the video data 18 may include information corresponding thereto. FIG. 5 is an explanatory figure for explaining an example of the contents of the video data 18. As shown in FIG. 5, for example, the video data 18 may include the information items "video ID", "managed items", and "data for display".

"Video ID" is information for identifying each of the videos MV. Information specifying a unique video ID for each of the videos MV may, for example, be employed as "video ID". And "data for display" is data that is required for causing each of the videos MV to be displayed upon the monitor MO. On the other hand, "managed items" is information for managing each of the videos MV. For example, "managed items" may include information specifying "provider", "viewing attributes", "progress", and "details". For example, this "managed items" information may be automatically added by the user terminal 5 during uploading. In other words, the user terminal 5 may perform processing to add this information along with the uploading (or when generating the video data 18).

"Provider" is information specifying the users U who provided each of the videos MV. For example, information specifying the user ID corresponding to the user U who uploaded each of the videos MV may be employed as the information "provider". And, if attributes are set for suitable users who are appropriate for viewing the videos MV, then "viewing attributes" is information specifying the attributes of this type of suitable user U. For example, information specifying the sex, the age or the like that are appropriate for viewing may be employed as the "viewing attributes" information. Moreover, "progress" is information specifying the degree of progression of the game. This information "progress" may, for example, be employed if the video MV is a game video.

Furthermore, if for example a numerical value that describes the degree of progression is set in the game as appropriate, then information specifying this type of numerical value may be employed as "progress" information. And "details" is information specifying characteristics of various types of the video MV, such as the characters that appear in the video MV or the level of a user U who is playing (for example, in the case of a game video). For example, information giving a unique character ID for each character for identifying the characters, or information for a numerical value that specifies a level, may be employed as the "details" information. And, for example, the video data 18 may be structured as a set of records in which these information items are described in association with one another. Furthermore in this case, for example, the information item "managed items" may function as the contents information of the present invention.

Figure 6:
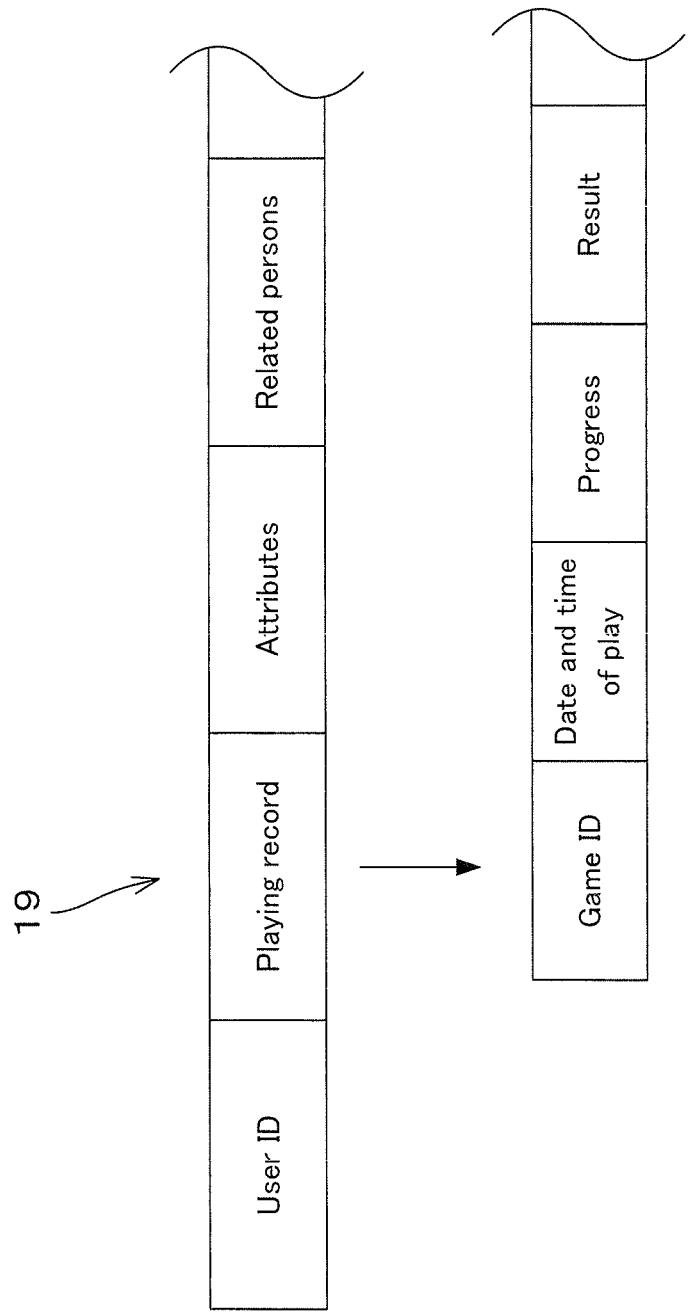
FIG. 6 is an explanatory figure for explanation of an example of the contents of play data.

Moreover, as described above, the play data 19 is data for managing unique information that is unique to each of the individual users U. FIG. 6 is an explanatory figure for explanation of an example of the contents of the play data 19. As shown in FIG. 6, for example, the play data 19 may include the information items "user ID", "playing record", "attributes", and "related persons". "User ID" is information specifying a user ID for identifying the individual user U. And "attributes" is information for specifying attributes of the individual users U. For example, information specifying sex and/or age may be employed as the information "attributes". Moreover, "related persons" is information specifying another user or users U with whom a relationship is established. For example, if association setting for establishing associations between users U is permitted in the game, then this may be employed as the information "related persons". And a relationship between users U may be set via this type of association setting. Also, for example, friend registrations or rival registrations in the game may be employed as association settings of this type. And, for example, information specifying the user ID of another user U with whom this type of friend registration has been established may be employed as the "related persons" information. Incidentally, a plurality of types of user ID that are managed by different systems may be employed with the video distribution system 1. In concrete terms, for example, there may be a difference of type (management systems and so on) between the user IDs employed by the web browser and the user IDs employed by the game application. In other words, different user IDs corresponding to the same user may be employed by the web browser and by the game application. And this type of association between user IDs may, for example, be managed by ID management data. Due to this, for example, different types of information specifying user IDs may be employed for the "user ID" of the play data 19 and for the "provider" of the video data 18.

On the other hand, "playing record" is information specifying the playing record in the game. For example, "playing record" may include the information items "game ID", "date and time of play", "progress", and "result". "Game ID" is information specifying a unique game ID for each game, in order to identify each game when there are a plurality of games. Moreover, "date and time of play" and "result" are information items respectively specifying the data and time when the game was played, and the result of the game at that time. On the other hand, "progress" is information specifying the degree of progress in the game. For example, in a similar manner to the case for the video data 18, if a numerical value specifying the degree of progress is set in the game as appropriate, then information specifying this type of numerical value may be employed as the information "progress". Furthermore, the play data 19 may be structured as a set of records in which these items of information are described in mutual correspondence. For example, in this case, the information about user ID that corresponds to "user ID" may function as the user identification information of the present invention. Moreover, for example, the information items "playing record" and "related persons" may function as the activity result information of the present invention. Yet further, for example, information formed by adding "attributes" to this activity result information may function as the unique information of the present invention.

Next, the recommendation processing and the distribution restriction processing will be explained. The recommendation processing is processing for actively providing information related to a part of the videos, among the plurality of videos MV that can be distributed. For example, the recommendation processing may be adapted to extract related videos MV1 as a part of the videos from among the plurality of videos MV that can be distributed, and actively to provide information about those related videos MV1. In more concrete terms, for example, the recommendation processing may be adapted to implement processing corresponding to steps S3 and S4 of the video distribution service of the FIG. 3 example.

On the other hand, the distribution restriction processing is processing for restricting the distribution of a part of the plurality of videos MV that can be distributed. For example, the distribution restriction processing may be adapted to extract related videos MV1 from among the plurality of videos MV that can be distributed, and to restrict the distribution of those related videos MV1. In more concrete terms, for example, the distribution restriction processing may be adapted to implement processing corresponding to steps S3 and S4 of the video distribution service of the FIG. 4 example.

Figure 7:
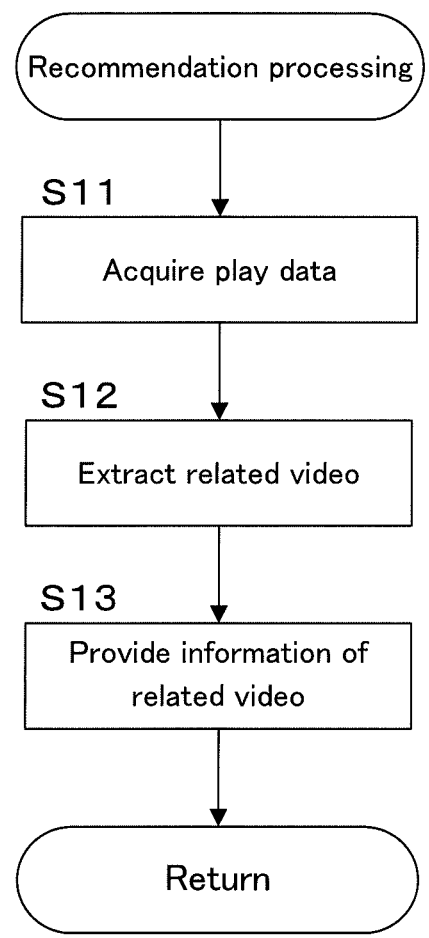
FIG. 7 is a figure showing an example of a flow chart of a recommendation processing routine.
Figure 8:
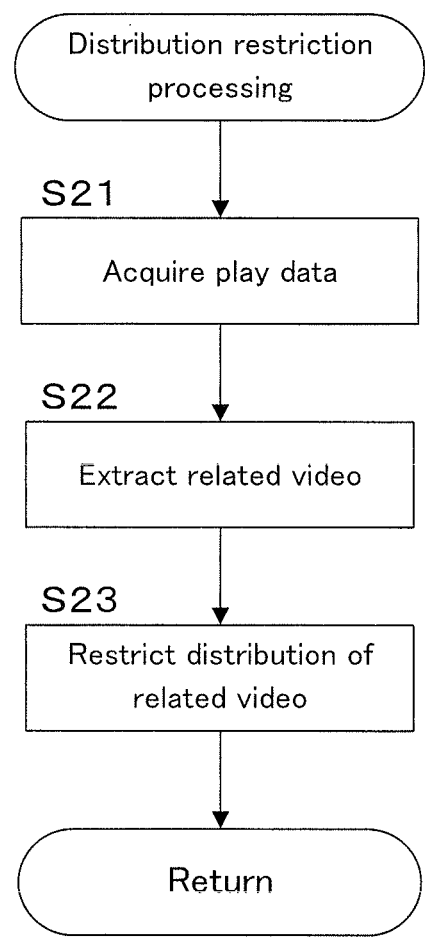
FIG. 8 is a figure showing an example of a flow chart of a distribution restriction processing routine.

For example, the recommendation processing may be implemented by the control unit 10 of the server 2 via the routine of FIG. 7, while the distribution restriction processing is implemented via the routine of FIG. 8. In more concrete terms, for example, the routines of FIG. 7 and FIG. 8 may be executed by the web service management unit 17 of the control unit 10. Incidentally, apart from this processing, the control unit 10 of the central server 2 and the control unit 30 of the user terminal 5 execute various types of per se known processing and so on, either individually or in mutual cooperation. However, detailed explanation thereof is omitted.

FIG. 7 is a figure showing an example of a flow chart of a recommendation processing routine for implementing recommendation processing. Moreover, the example of FIG. 7 illustrates a case in which activity result information for an individual user U included in the play data 19 is employed for extraction of related videos MV1. For example, the routine of FIG. 7 may be executed each time a request for video distribution is issued via a user terminal 5. Incidentally, if distribution of related videos MV1 is restricted via distribution restriction processing, then, in order again to recommend a portion of the remaining videos MV2 as subjects for distribution, the routine of FIG. 7 may be executed each time the processing of step S23 of the routine of FIG. 8 is executed.

When the routine of FIG. 7 is started, first in step S11 the web service management unit 17 acquires the play data 19. In concrete terms, for example, the web service management unit 17 may acquire the play data 19 in step S11, so that a record corresponding to the user ID included in the request from the user terminal 5 are included therein.

In the next step S12, the web service management unit 17 extracts related videos MV1 from the videos MV that can be distributed, in other words from the group of videos MG that can be reproduced according to the video data 18. For example, the web service management unit 17 may extract the related videos MV1 from the video group MG corresponding to the video data 18 on the basis of an extraction condition. Furthermore, for example, the web service management unit 17 may employ activity result information as an extraction condition. In concrete terms, for example, the web service management unit 17 may employ the information items "playing record" and "related persons" in the play data 19 acquired in step S11 as activity result information. Moreover, for example, the web service management unit 17 may employ the "managed items" information in the video data 18 associated with this "playing record" and "related persons" information. In other words, in step S12, for example, on the basis of the information "playing record" and "related persons" in the play data 19, the web service management unit 17 may extract the related videos MV1 by classifying the video group MG corresponding to the video data 18 into the related videos MV1 having information items "provider", "viewing attributes", "progress", and "details" that are associated with those information items, and the remaining videos MV2 that are not associated with those information items.

In the next step S13, the web service management unit 17 provides the information specifying the related videos MV1 that has been extracted in step S12 to the source of the request. Furthermore, for example, the web service management unit 17 may employ recommendation information that recommends these related videos MV1 as this type of information. In other words, for example, as the information specifying the related videos MV1, the web service management unit 17 may provide recommendation information that recommends these related videos MV1 to the user terminal 5 that was the source of the request. Moreover, if the related videos MV1 include a plurality of videos MV, then the web service management unit 17 may provide thumbnails thereof to the user terminal 5 as the information specifying the related videos MV1. In this case, for example, the web service management unit 17 may arrange thumbnails of this type on the basis of a sorting criterion. In other words, as the information specifying the related videos MV1, the web service management unit 17 may provide a list to the user terminal 5 in which thumbnails of the related videos MV1 are arranged on the basis of the sorting criterion. And, when the processing of step S13 has been completed, the web service management unit 17 terminates this iteration of the routine.

According to the routine of FIG. 7, the related videos MV1 that are supposed to be associated with the activity record of the individual user U are extracted from the group MG of videos that can be distributed, and information relating to those related videos MV1 is actively provided. In more concrete terms, game videos having playing records in the game and/or videos MV that users U who are registered as friends in the game have uploaded are extracted as the related videos MV1, and information relating thereto is actively provided via recommendation information and/or via thumbnails that are arranged in order of relevance or the like. In other words, an example of a process corresponding to steps S3 and S4 of the video distribution service of the FIG. 3 example is implemented.

On the other hand, FIG. 8 is a figure showing an example of a flow chart of a distribution restriction processing routine for implementing distribution restriction processing. Moreover, the example of FIG. 8 illustrates a case in which unique information for an individual user U included in the play data 19 is employed for extraction of related videos MV1. For example, similarly to the case for the routine of FIG. 7, the routine of FIG. 8 may be executed each time a request for video distribution is issued via a user terminal 5.

When the routine of FIG. 8 is started, first the web service management unit 17 acquires play data 19 in step S21. In concrete terms, for example, the web service management unit 17 may acquire play data in step S21, so as to include the record corresponding to the user ID included in the request from the user terminal 5.

In the next step S22, the web service management unit 17 extracts the related videos MV1 from the videos MV that can be distributed, in other words from the video group MG that can be reproduced according to the video data 18. For example, the web service management unit 17 may extract the related videos MV1 from the video group MG corresponding to the video data 18 on the basis of an extraction condition. Furthermore, for example, the web service management unit 17 may employ unique information that is unique to each of the users U as the extraction condition. For example, the web service management unit 17 may employ the "progress" information of the play data 19 that has been acquired in step S21 (in other words, a part of the information "playing record") as the unique information that is unique to the users U. Moreover, for example, the web service management unit 17 may employ the information item "managed items" of the video data 18 in association with these information items "playing record" and "related persons". In other words, for example, in step S22, on the basis of the information "progress" in the play data 19, the web service management unit 17 may classify the video group MG corresponding to the video data 18 into the related videos MV1 that have information items "provider", "viewing attributes", "progress", and "details" that correspond to that information, and the remaining videos MV2 that are not associated with that information. In more concrete terms, for example, the web service management unit 17 may extract the related videos MV1 by classifying those videos MV (the videos having this type of "progress" information) whose degree of progression is greater than the degree of progression corresponding to "progress" acquired in step S21 (for example, those that have progressed by more than a predetermined range based upon that degree of progression) as related videos MV1, and by classifying those videos MV whose degree of progression is lower (for example, those that have not progressed by more than the predetermined range based upon that degree of progression) as remaining videos MV2.

In the next step S23, the web service management unit 17 restricts distribution of the related videos MV1 that were extracted in step S22. For example, the web service management unit 17 may restrict the distribution of the related videos MV1 by eliminating the related videos MV1 from the videos MV that were the subject of the request. Furthermore, for example, this type of elimination may be implemented by excluding the information specifying the related videos MV1 from the information provided to the user terminal 5 specifying the videos MV that can be distributed. In concrete terms, for example, if there are a plurality of videos MV that can be distributed, then thumbnails whose subjects are those videos MV may be provided to the user terminal 5, and video data 18 may be distributed on the basis of the result of selection among those thumbnails. And, for example, the web service management unit 17 may restrict the distribution of the related videos MV1 by eliminating the related videos MV1 from the subjects of this type of thumbnails (i.e. by selecting the subjects for distribution). In other words, the web service management unit 17 may restrict distribution of the related videos MV1 by only providing thumbnails whose subjects are the remaining videos MV2, with the related videos MV1 being eliminated. And, when the processing of step S23 has been completed, the web service management unit 17 ends this iteration of the routine.

According to the routine of FIG. 8, the related videos MV1 which are supposed to be associated with the unique information for the user U are extracted from the video group MG that can be distributed, and distribution of those related videos MV1 is restricted. In more concrete terms, videos MV for which restrictions are set corresponding to the attributes of the user U, such as an age restriction or a sex restriction, or videos MV for which the degree of progression is greater than the state of progression of the game of the user U who was the source of the request, are extracted as the related videos MV1. And distribution of the related videos MV1 of this type is restricted by excluding the related videos MV1 of this type from the subjects of thumbnails, in other words by excluding them from the specific options for the subjects for distribution. In this manner, an example of processing corresponding to steps S3 and S4 of the video distribution service of the FIG. 4 example is implemented.

As explained above, according to this embodiment, the related videos MV1 are extracted from the video group MG that is to be distributed on the basis of the extraction condition. And the distribution of these related videos MV1 is actively provided, or conversely is restricted. In other words, the distribution of the related videos MV1 of this type is controlled. In concrete terms, for example, the related videos MV1 are extracted on the basis of the game activity result information among the unique information in the play data 19, and the information for these related videos MV1 is actively provided. Not only the current state of play, but also various activities of individual users U in the past, such as the states of play in other games, related settings of registered friends and so on, are reflected in the activity record. Due to this, the related videos MV1 can be extracted under various conditions other than by extraction on the basis of the current state of play, and information about related videos of this type can be provided to the user U as video recommendations, for example via comment information or the like. In other words, for example, videos MV related in various ways to each user U can be extracted from among the plurality of videos MV related to the game, and can be recommended. As a result, for example, by recommending videos MV, not only of games for which there is a playing record, but also of other games for which there is no playing record, it is possible to promote the utilization of other games of this type.

On the other hand, for example, there are some cases in which related videos MV1 are extracted, and in which these related videos MV1 are restricted, on the basis of the information "attributes" and "progress" in the unique information. In these cases, as opposed to the case described above, it is possible to set distribution restrictions with reference to more diverse criteria, on the basis of unique information that includes more diverse types of information. In concrete terms, for example, since it is possible to set, not only restrictions on the basis of the degree of progression in the game that is being played, but also restrictions on the basis of the degree of progression of play from the past, or restrictions on the basis of characters that appear in the game being played (for example, restrictions upon the videos MV of other games in which characters of this type appear), accordingly it is possible to set distribution restrictions so as to better to match the characteristics of the user U.

Furthermore, unique information (including activity result information) of each user is specified for each user with the user ID as a key. Due to this, it is possible to permit a user terminal 5 to perform utilization of the videos MV and playing of a game via separate applications. In concrete terms, for example, it is possible to permit the user terminal 5 to perform playing of the game and replay of videos MV via a game application and via a web browser, respectively. In other words, it is possible to provide, or to restrict, related videos MV1 even for applications that have different functions, such as a game application for providing a game machine function and a web browser for providing a video replay function.

Accordingly, it is possible better to cope with the diverse needs of users.

In the embodiment described above, by executing the routine of FIG. 7, the control unit 10 of the central server functions as the video extraction device and as the information provision device of the present invention. On the other hand, by storing the video data 18 and the play data 19, the storage unit 11 of the central server 2 functions as the video data storage device and as the activity data storage device of the present invention.

The present invention is not limited to the embodiment described above; it may be varied as appropriate. For example, in the embodiment described above, the user terminals 5 function both as video display terminals and as game terminals, according to differences in their software. However, the present invention is not limited to this type of form. For example, the user terminals 5 may be adapted to function as video display terminals or as game terminals, according to differences in their hardware. In other words, for example, it would be possible for two user terminals 5 that are embodied as a personal computer and as a tablet to function respectively as a video display terminal and as a game terminal. Furthermore, for example, apart from the user terminals 5, commercial game machines (for business use) that enable users to play games in a predetermined range for payment or for free may be connected to the central server 2 via the network 3 as game terminals. Moreover, in this case, game machines of this type may also be employed as dedicated game terminals.

In the following, examples of the present invention are described that are obtained from the details described above. Incidentally, in order to facilitate understanding of the present invention, reference symbols in parentheses that refer to the appended figures are supplemented in the following explanation, but the present invention is not thereby to be considered as being limited to the embodiments shown in the figures.

The server device of the present invention is a server device (2) that comprises a computer (10) having a video data storage device (11) which stores video data (18) for displaying a plurality of videos (MG) relating to a game provided by a game terminal (5), and that, when managing the videos (MV) and contents information related to contents of the videos in mutual association, extracts a part of the videos from the plurality of videos on the basis of a request from a video display terminal (5) that is connected via a network (3) and the contents information, and distributes the video data corresponding to the part of the videos to the video display terminal, and wherein the computer serves as: an activity data storage device (11) that stores activity data (19) in which user identification information for identifying users (for example, user IDs) and activity result information (for example, "playing record") for the users in relation to the game are described in mutual association; a video extraction device (10) that, when the user identification information of a user is provided via the video display terminal along with the request from the video display terminal, extracts, on the basis of the activity data and the contents information, a related video (MV1) relating to the activity result information of the user as the part of the videos by taking the user identification information as reference from the plurality of videos; and an information provision device (10) that provides information about the related video to the video display terminal on the basis of a result of extraction by the video extraction device.

According to the present invention, the related video is extracted on the basis of the activity result information of the activity data related to the game, and information about this related video is provided. Not only the current state of play, but also various activities of individual users in the past are reflected in the activity record. Due to this, related videos can be extracted under many conditions including various conditions other than on the basis of the current state of play, and information about the related videos of this type can be provided, for example, as recommended videos. In other words, it is possible to extract videos related to a user in various ways from among a plurality of videos relating to the game, and to recommend those videos. As a result, for example, by recommending videos, not only of games for which there is a playing record but also of other games for which there is no playing record, it is possible to promote the employment of such other games. Furthermore, since the activity result information of each user are specified by using the user identification information as key, accordingly it is possible to provide and to distribute information about related videos, not only to a single terminal that functions both as a video display terminal and as a game terminal, but also to separate terminals that respectively function as a video display terminal and as a game terminal (including a single terminal that is employing separate applications). By doing this, it is possible to respond to diverse needs of users.

Results in various types of activities in various types of games may be employed as the activity result. For example, according to one aspect of the server device of the present invention: when the game permits association setting for establishing association between the users, the activity result information may include the user identification information for other users (U1) who are associated via the association setting; the contents information may include the user identification information for the users (U1) who have provided the video data corresponding to videos; and, the video extraction device may employ the user identification information corresponding to the association setting as the activity result information, and may extract a video provided by one of the other users as the related video on the basis of the association setting of the users of the user identification information of the user and the contents information. Or, according to another aspect of the server device of the present invention: the activity result information may include information specifying the playing records of the users in relation to the game; and the video extraction device may employ the information of the playing record as the activity result information, and may extract the related video on the basis of the information specifying a playing record of the user of the identification information, and the contents information.

On the other hand, a non-transitory computer readable storage medium according to the present invention is a non-transitory computer readable storage medium storing a computer program that is adapted to cause the computer (10) having the video data storage device and the activity data storage device to function as the devices of the server device described above. By executing the computer program of the present invention, it is possible to implement the server device of the present invention.

The invention claimed is:

1. A server device that comprises a computer having a video data storage device which stores video data for displaying a plurality of videos relating to a game provided by a game terminal, and that, when managing the videos and contents information related to contents of the videos in mutual association, extracts a part of the videos from the plurality of videos on the basis of a request from a video display terminal that is connected via a network and the contents information, and distributes the video data corresponding to the part of the videos to the video display terminal, and wherein the computer serves as:

an activity data storage device that, when multiple types of games are included in the game, stores activity data that associates user identification information for identifying users with corresponding activity result information including information specifying playing records for each user in relation to the multiple types of games;

a video extraction device that, when the user identification information of a user is provided via the video display terminal along with the request from the video display terminal, extracts, on the basis of the activity data and the contents information, related videos relating to the activity result information including information specifying the playing record of the user as the part of the videos by taking the user identification information as reference from the plurality of videos; and an information provision device that provides information about the related video to the video display terminal on the basis of a result of extraction by the video extraction device, and wherein the video extraction device extracts two or more videos relating to two or more games respectively among the multiple types of games, on the basis of the activity result information including information specifying the playing record of one game of the user of the plurality of users among the multiple types of games.

2. The server device according to claim 1, wherein:

when the game permits association setting for establishing association between the users, the activity result information includes the user identification information for other users who are associated via the association setting;

the contents information includes the user identification information for the users who have provided the video data corresponding to videos; and the video extraction device employs the user identification information corresponding to the association setting as the activity result information, and extracts a video provided by one of the other users as the related video on the basis of the association setting of the users of the user identification information of the user and the contents information.

3. A non-transitory computer readable storage medium storing a computer program that is adapted to cause the computer having the video data storage device and the activity data storage device to function as the devices of the server device according to claim 1.

* * * * *